United States Patent
Nyffenegger

(10) Patent No.: US 7,168,330 B1
(45) Date of Patent: Jan. 30, 2007

(54) MULTI-PARAMETRIC MEDIA TRANSDUCER

(75) Inventor: Johannes Friederich Nyffenegger, Laguna Niguel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/448,696

(22) Filed: Jun. 7, 2006

(51) Int. Cl.
*G01F 1/28* (2006.01)

(52) U.S. Cl. ..................................... 73/861.71
(58) Field of Classification Search ............ 73/861.74, 73/861.71, 861.75, 861.77, 861.76
See application file for complete search history.

(56) References Cited

U.S. PATENT DOCUMENTS

| | | |
|---|---|---|
| 4,347,745 A | 9/1982 | Singh |
| 5,663,508 A * | 9/1997 | Sparks ................. 73/861.71 |
| 6,212,958 B1 * | 4/2001 | Conley ................. 73/861.74 |
| 6,408,698 B1 | 6/2002 | Brereton et al. |
| 6,592,253 B2 | 7/2003 | Nyffenegger et al. |
| 6,631,648 B2 | 10/2003 | Lal et al. |
| 6,901,794 B2 | 6/2005 | Zobel et al. |

* cited by examiner

*Primary Examiner*—Jewel Thompson
(74) *Attorney, Agent, or Firm*—Tarolli, Sundheim, Covell & Tummino LLP

(57) ABSTRACT

A multi-parametric transducer is provided. In one aspect of the invention, the multi-parametric transducer includes an enclosure having an inner bore that defines a port, an inner chamber coaxial with the inner bore and disposed in the enclosure, and a sensing tube surrounding at least a portion of the inner chamber. The transducer further includes a temperature probe having a resistive temperature device (RTD) element disposed in a reinforced sheath at a measurement end of the transducer. The reinforced sheath is configured as a flow force sensing beam having a first end that extends through the sensing tube toward a signal end of the transducer and a second end that extends through the port outside the enclosure toward the measurement end of the transducer. A flow sensor is provided with measuring portions positioned on the sensing tube along a flow sensing axis that is substantially parallel to the media flow axis that provides a signal indicative of the media flow rate at the measurement end of the reinforced sheath.

20 Claims, 2 Drawing Sheets

MULTI-PARAMETRIC MEDIA TRANSDUCER

TECHNICAL FIELD

The present invention relates generally to measurement devices, and more particularly to a multi-parametric media transducer.

BACKGROUND

Flow rate transducers are used in many applications for sensing the flow of media in the form of slurries, liquids and gases, for example, through pipes. Additionally, pulsed flow measurements are typically accomplished by controlling a valve arrangement for a specific time at a known pressure to arrive at a desired quantity of media, which is very time consuming, not accurate and not repeatable. This is particularly the case for flow pulses at low and high extreme pressures and temperatures with low pulse durations (e.g., 500 microseconds) or extremely low leakage flows. Flow rate transducers are used in certain high energy laser systems to detect the flow rate of cooling water, basic hydrogen peroxide (BHP), iodine, chlorine and other chemicals used in the generation of the laser beam and in accurate measurements of pulsed flows of oxidizers and fuels in secondary combustion augmented thrusters, monopropellant or bipropellant liquid thrusters of satellites. Other applications include medical, pharmaceutical, food, chemical, aerospace and industrial applications. In certain applications, such as high energy laser systems or satellite thrusters, it is important to measure flow rates very accurately and very quickly. Separate transducers can be employed to measure other parameters, such as media temperature or media pressure. However, this type of approach is not desirable for flight applications, such as satellites, spacecrafts, missiles and aircraft due to weight and space limitations.

SUMMARY

In one aspect of the invention, a media flow transducer is provided having an enclosure having an inner bore that defines a port, an inner chamber coaxial with the inner bore and disposed in the enclosure and a sensing tube surrounding at least a portion of the inner chamber. The transducer further comprises a flow force sensing beam having a first end that extends through the sensing tube toward a signal end of the transducer and a second end that extends through the port outside the enclosure toward a measurement end of the transducer. The flow force sensing beam is configured to sense a flow of media along a media flow axis at the measurement end and transfer a bending moment of the beam to the sensing tube. The transducer further includes a flow sensor with measuring portions positioned on the sensing tube along a flow sensing axis that is substantially parallel to the media flow axis that provides a first signal indicative of the media flow rate at the measurement end of the flow force sensing beam and pressure in the sensing tube, and a pressure error sensor with measuring portions positioned on the sensing tube along a neutral axis, that is substantially perpendicular and 90° offset from the flow sensing axis, that provides a second signal indicative of the pressure in the sensing tube. A circuit is provided that is operative to subtract the second signal from the first signal to provide an output signal indicative of the media flow rate at the measurement end of the transducer compensated for pressure in the sensing tube.

In another aspect of the invention, a multi-parametric transducer is provided that includes an enclosure having an inner bore that defines a port, an inner chamber coaxial with the inner bore and disposed in the enclosure, and a sensing tube surrounding at least a portion of the inner chamber. The transducer further includes a temperature probe having a resistive temperature device (RTD) element disposed in a reinforced sheath at a measurement end of the transducer. The reinforced sheath is configured as a flow force sensing beam having a first end that extends through the sensing tube toward a signal end of the transducer and a second end that extends through the port outside the enclosure toward the measurement end of the transducer. The reinforced sheath is configured to sense a flow of media along a media flow axis at the measurement end and transfer a bending moment of the beam to the sensing tube. A flow sensor with measuring portions positioned on the sensing tube along a flow sensing axis that is substantially parallel to the media flow axis that provides a signal indicative of the media flow rate at the measurement end of the reinforced sheath In yet another aspect of the invention, a multi-parametric transducer is provided having an enclosure having an inner bore that defines a pressure port at a measurement end of the transducer, a first inner chamber coaxial with the inner bore and disposed in the enclosure, a flow sensing tube that surrounds at least a portion of the first inner chamber, and a second inner chamber coaxial with the inner bore and disposed in the enclosure. The second inner chamber is adjacent the first inner chamber and disposed toward the measurement end of the transducer relative to the first inner chamber. The transducer further includes a pressure sensing tube coaxial and adjacent the flow sensing tube. The pressure sensing tube surrounds at least a portion of the second inner chamber.

A flow force sensing beam includes a first end that extends through the pressure sensing tube and the flow sensing tube toward a signal end of the transducer and a second end that extends through the pressure port outside the enclosure toward the measurement end of the transducer. The flow force sensing beam is configured to sense a flow of media along a media flow axis at the measurement end and transfer a bending moment of the beam to the flow sensing tube. A flow sensor with measuring portions positioned on the flow sensing tube along a flow sensing axis that is substantially parallel to the media flow axis that provides a signal indicative of the media flow rate at the measurement end of the transducer. The transducer further comprises a pressure sensor with measuring portions positioned on the pressure sensing tube that provides a signal indicative of pressure in the pressure sensing tube and at the measurement end of the transducer.

DETAILED DESCRIPTION

The present invention relates to a multi-parametric media transducer. The multi-parametric media transducer integrates a flow rate transducer with a temperature transducer and pressure transducer. The media can be in the form of form of slurries, liquids and gases or a combination thereof. The integrated flow, temperature, and pressure transducer can be operative for measuring the flow rates, pressures and temperatures of cooling water or corrosive media, such as molten iodine, chlorine, ammonia, basic hydrogen peroxide and others very accurately and extremely fast without being degraded or destroyed by the media. The flow rate sensor can employ an end of a reinforced sheath of a temperature sensor probe as a flow force sensing beam for the flow rate transducer.

In one aspect of the invention, the multi-parametric media transducer provides for the integration of a pressure transducer, fast temperature probe and flow measurement mechanism into a single instrument packaged in a single housing. A part or all of the outer portions of the instrument can be machined from various thermally conductive materials, such as inconel, stainless steel, hastelloy, copper, brass, or any variations of an alloy of inconel, stainless steel, hastelloy, copper, brass or other conductive alloy, to be compatible with a variety of corrosive pressure media, such as molten iodine, chlorine, ammonia, hydrogen peroxide, hydrogen fluoride, and others. The multi-parametric media transducer can be configured to be directly pipe mounted for smaller pipe sizes, or be flange configured for larger pipe sizes.

The multi-parametric transducer provides for a significant improvement in the measurement of pulsed flows of very short duration in the millisecond range, combined with the measurement of pressure and temperature at the same point in the system for accurate and repeatable calculations for mass flows. The multi-parametric transducer provides for improved sensitivity, reduced weight, excellent hysteresis, repeatability, linearity, absolute static and dynamic accuracy and fast response time at reduced manufacturing and maintenance costs with a simple construction and no moving parts.

Figure 1:
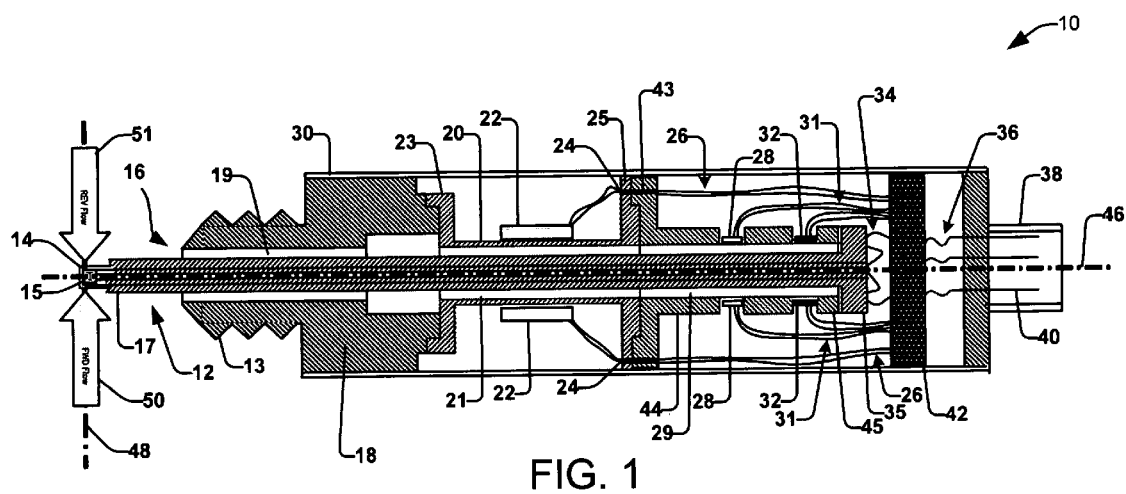
FIG. 1 illustrates a cross-sectional view of a multi-parametric transducer assembly in accordance with an aspect of the present invention.
Figure 2:
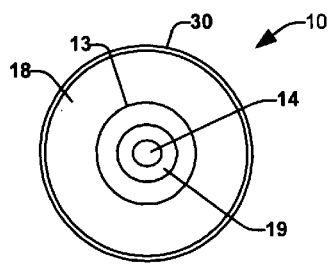
FIG. 2 illustrates a measurement end view of the multi-parametric transducer of FIG. 1.

FIG. 1 illustrates a length-wise, cross-sectional view of a multi-parametric media transducer 10 in accordance with an aspect of the present invention. FIG. 2 illustrates a measurement end view of the multi-parametric transducer 10 of FIG. 1. The transducer 10 includes a temperature probe 12 that is operative to measure media temperature, while concurrently being employed as a flow force sensing beam of a flow rate sensor. The probe 12 is inserted into an enclosure 30 through a bore 19 extending through an end piece 18 attached to one end of the enclosure 30, so that an end cap 14 of the probe 12 extends therefrom, as shown. The end cap 14 of the temperature probe 12 includes a high precision resistive temperature device (RTD) element 15 for measuring temperature of the media. A reinforced sheath or housing 17 extends from the end cap 14 through the bore 19 of the enclosure 30. The reinforced sheath or housing 17 that extends outside the enclosure 30 can operate as a flow force sensing beam to facilitate the detection of media flow along a media flow axis 48 in either a forward direction as indicated by arrow 50 or a reverse direction as indicated by arrow 51. The end piece 18 can include a threaded connector 13 that allows the transducer 10 to be threadably connected to a suitable opening, for example in a pipe or flange, as would be well understood to those skilled in the art.

The bore 19 defines a pressure port 16 of the transducer 10. A pressure sensing tube 20 is mounted within the enclosure 30 extending to a flow force sensing tube 44 that is mounted within the enclosure 30 adjacent the pressure sensing tube 20 along a central longitudinal axis 46 of the transducer 10. A first front end flange 23 of the pressure sensing tube 20 is mounted to the end piece 18 and a first back end flange 25 of the pressure sensing tube 20 is mounted to a second front end flange 43 of the flow sensing tube 44, as shown. A second back end flange 45 of the flow sensing tube 44 is secured to an end flange 35 of the temperature probe 12 to secure the temperature probe 12 within the enclosure 30. The end flange 35 can be constructed of a thermally non-conductive high impact plastic composite material protected by an outer composite film to protect against corrosive effects of the media. The purpose of the non-conductive end flange 35 is to prevent the metallic mass of the device to act as a heat sink, thus negatively impacting the time constant of the RTD temperature probe 12. Additionally, extended support fins (not shown) can be held within the bore 19 placed around an outside housing of the probe 12 to provide limiting stops if the device is operated at out-of-range flows.

A first chamber 21 within the pressure sensing tube 20 is coaxial with the bore 19. A full bridge, temperature compensated metal film strain gage arrangement 22, for sensing pressure in the pressure sensing tube 20, is bonded to an outside surface of the sensing tube 20 within the enclosure 30. A second chamber 29 within the flow sensing tube 44 is coaxial with the bore 19 and the pressure sensing tube 20. A first full bridge, temperature compensated solid state strain gage arrangement 28, for sensing pressure error, is bonded to an outside surface of the flow sensing tube 44 within the enclosure 30. A second full bridge, temperature compensated solid state strain gage arrangement 32, for sensing flow, is also bonded to an outside surface of the flow sensing tube 44 within the enclosure 30.

An electrical receptacle 38 including pin terminals 40 is mounted and hermetically sealed to a signal end of the enclosure 30 opposite the end piece 18. A signal conditioning module 42 is mounted within the enclosure between the end flange 35 of the temperature probe 12 and the receptacle 38. Four signal lines 26, one for each leg of the bridge in the pressure sensor 22, two excitation signals and two pressure sensor measurement signals, are electrically coupled to the sensor 22 and the conditioning module 42. Additionally, eight signal lines 31, one for each leg of the bridges of the pressure error sensor 28 and flow sensor 32, four excitation signals and two pressure error sensor measurement signals and two flow sensor measurement signals, are electrically coupled to the conditioning module 42. Likewise, the signal lines 34 from the temperature probe 12 are coupled to the conditioning module 42.

The conditioning module 42 processes the signals on the signal wires 26, 31 and 34 and provides selective temperature sensing, flow rate sensing, and pressure sensing outputs on signal wires 36. The signal wires 36 are coupled to the connector pins 40 of the electrical receptacle 38 sealed to the enclosure 30. The receptacle 38 can be electrically coupled to any suitable measuring circuit (not shown) to provide a display of the temperature, pressure and flow rate, as would be well understood to those skilled in the art. The conditioning module 42 may consist of a smart integrated signal processing module, powered by high intensity light over fiber, and transmitting the temperature, pressure and flow rate data in the form of serial digital light signals at high speed over fibers, such as the signal conditioning module disclosed in commonly assigned U.S. patent application Ser. No. 11/409,627, filed Apr. 24, 2006, entitled, "Smart Integrated, Distributed, Light Powered Process Control System with Fiber Optic Data Transmission", the entire contents of which is hereby incorporated herein.

For temperature measurements, the temperature of the pressurized media is sensed with the precision thin film platinum RTD element 15 embedded in the end cap 14 of the reinforced temperature probe sheath and flow force sensing beam 12. The RTD element 15 can be embedded in the end cap 14 via a silver potting material, such as that illustrated in commonly assigned U.S. Pat. No. 6,592,253, entitled "Precision Temperature Probe Having Fast Response", the entire contents of which is incorporated herein. Alternatively, the RTD element 15 can be embedded in a thermally conductive insert disposed in the end cap 14, as illustrated in commonly assigned U.S. patent application Ser. No. 11/411,511, filed Apr. 26, 2006, entitled "Temperature Probe and Method of Making the Same", the entire contents of which is incorporated herein. The integrated signal conditioner module 42 filters, amplifies and converts the electrical signal generated by the precision RTD element 15 into a 4 to 20 mA current loop signal, which is directly proportional to the temperature of the pressurized media.

For pressure measurements, an external pressure change in the media is transferred to the first chamber 21 through the bore 19, and causes the pressure sensing tube 20 to expand or contract in response thereto. This expansion or contraction of the pressure sensing tube 20 unbalances the full bridge metal film strain gage arrangement 22 and produces an analog signal directly proportional to the pressure in the pressure sensing tube 20. The signal lines and excitation lines 26 are electrically coupled to opposite legs of the full bridge metal film strain gage arrangement or pressure sensor 22, in a manner that is well understood in the art.

In one aspect of the invention, the pressurized media enters the pressure sensing tube 20 through the pressure port 16 and expands the diameter of the pressure sensing tube 20 proportionally to the pressure of the media. The wall thickness of the pressure sensing tube 20 can be proportional to the pressure sensing range of the pressure sensor 22. For example, the wall thickness can be proportionally thin for the low end pressure range, and increasingly thicker for the top end pressure range. On the outside, the pressure sensing tube 20 is instrumented with the bonded metal film strain gage 22 in a full bridge configuration that includes temperature compensation. The temperature compensation can be accomplished with a precision resistor connected to a subtractor amplifier with the precision resistor bonded near the pressure sensing tube 20 to measure the temperature of the pressure sensing tube, such that as the temperature changes, the resistance of the precision resistor changes proportionally, providing the required compensation voltage for the subtractor amplifier.

The full bridge strain gage arrangement, excited with a dc voltage, is balanced at zero output with zero pressure applied to the pressure port 16. As the media pressure increases at the pressure port 16 and the first chamber 21, the pressure sensing tube 20 expands and the full bridge strain gage pressure sensor 22 is unbalanced, producing an electrical output signal proportional to the pressure change. The integrated signal conditioner module 42 filters and converts the signal into a 4 to 20 mA current loop signal, which is directly proportional to the pressure of the media applied to the pressure sensing tube 20. Alternately, the signal conditioner module 42 can produces 0 to 5 volts $V_{DC}$ or 0 to 10 $V_{DC}$ output signals with bridge excitation signals at 5 $V_{DC}$ or 10 $V_{DC}$, respectively.

For flow rate measurements, the reinforced temperature probe sheath and flow force sensing beam 12 senses the velocity pressure head of the media and transmits the moment of the beam 12 to the flow force sensing tube 44, which is instrumented with the two semiconductor strain gage flow sensors 28 and 32 in full bridge configuration, including temperature compensation and pressure compensation. The second full bridge temperature compensated solid state strain gage arrangement of flow sensor 32 includes measurement portions bonded on a flow sensing axis 47 that is substantially parallel to the media flow axis 48 and converts the velocity pressure head into a proportional electrical signal in millivolts. The first full bridge temperature compensated solid state strain gage arrangement of pressure error sensor 28 includes measurement portions bonded on a neutral axis 49 of the flow force sensing tube 44 that is substantially perpendicular to the flow sensing axis 47, and measures the pressure of the media and produces the electrical signal needed to compensate for the pressure error in the flow rate measurement induced by the media pressure.

Figure 3:
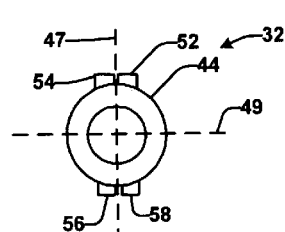
FIG. 3 illustrates a representative view of a flow sensor mounted to the flow sensing tube in accordance with an aspect of the present invention.

FIG. 3 illustrates a representative view of the flow sensor mounted to the flow sensing tube 44 in accordance with an aspect of the present invention. As illustrated in FIG. 3, the flow sensor 32 is mounted with a first leg 52 and a third leg 54 of the bridge mounted on the flow sensing tube 44 along the flow sensing axis 47 on a first side (e.g., for measuring compression), and the second leg 56 and the fourth leg 58 of the bridge mounted along the flow sensing axis 47 on a second side (e.g., for measuring tension) of the flow sensing tube 44. The flow sensor 32 measures the strain and compression on the flow sensing tube 44 to provide a signal indicative of the flow rate caused by the bending moment of the reinforced temperature probe sheath and flow force sensing beam 12 on the flow sensing tube 44. In this arrangement the signal is doubled to provide a flow signal with better resolution than employing a single leg on both the first and second side with the other two legs being offset from the flow sensing tube 44.

Figure 4:
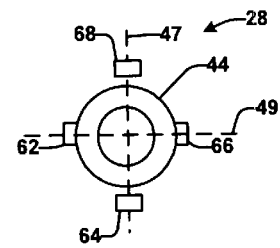
FIG. 4 illustrates a representative view of a pressure error sensor mounted to the flow sensing tube in accordance with an aspect of the present invention.

Additionally, the signal provided by the flow sensor 32 is influenced by the expansion on the flow sensing tube 44 caused by the pressure of the media in the flow sensing tube 44. The pressure error sensor 28 provides a signal indicative of pressure of the media in the flow sensing tube 44 to be used to compensate the flow rate measurement due to pressure. FIG. 4 illustrates a representative view of the pressure error sensor 28 mounted to the flow sensing tube 44 in accordance with an aspect of the present invention. As illustrated in FIG. 4, the pressure error sensor 28 is mounted with a first leg 62 of the bridge and a third leg 66 of the bridge mounted on the flow sensing tube 44 along the neutral axis 49 that is 90° offset and substantially perpendicular to the flow sensing axis 47, and the second leg 64 of the bridge and the fourth leg 68 of the bridge mounted along the flow sensing axis 47 and spaced apart and neutralized from the flow sensing tube 44. The first leg 62 and the third leg 66 of the bridge of the pressure error sensor 28 provides a signal indicative of the expansion of the flow sensing tube 44 caused by the pressurized media.

Since the portion of the pressure error sensor 28 that is mounted to the flow sensing tube 44 is along the neutral axis 49, the pressure error sensor 28 provides signals that are substantially free from influences of the flow rate of the media, and as a result provide a substantially accurate pressure measurement that can be subtracted from the measured flow rate of the flow sensor 32 to provide a substantially accurate flow rate measurement.

Alternatively, the flow sensor 32 of FIG. 3, could be configured similar to the arrangement illustrated in FIG. 4 with the first leg 52 of the bridge mounted on the flow sensing tube 44 on a first side along the flow sensing axis 47 and the third leg 54 of the bridge mounted on the flow sensing tube 44 on a second side along the flow sensing axis 47, and the second leg 56 of the bridge and the fourth leg 58 of the bridge mounted off the flow sensing but along the neutral axis 49. In this configuration, the output signal would be ½ the value of the output signal provided by the configuration illustrated in FIG. 3.

As illustrated in FIG. 1, the multi-parametric transducer 10 includes separate pressures measurements for the pressure sensing tube 20 and flow sensing tube 44. This allows the use of different materials for the pressure sensing tube and flow sensing tube optimal for measuring pressure and flow, respectively, However, it is to be appreciated that the pressure sensor 22 in the pressure sensing tube 44 can be employed to provide a pressure measurement and a pressure error measurement or the pressure error sensor 28 could be employed to provide a pressure measurement and a pressure error measurement alleviating the need for separate pressure sensors and/or sensing tubes.

It is to be appreciated that the wall thickness of the reinforced temperature probe sheath and flow force sensing beam 12 can be proportional to the flow sensing range of the transducer, i.e., proportionally thin for the low end flow range, and increasingly thicker for the top end flow range. In one aspect of the invention, the integrated signal conditioner module filters 42, amplifies and converts the electrical signal produced by flow sensor 32 minus the signal produced by pressure error sensor 28 into a 4 to 20 mA current loop signal, which is directly proportional to the flow of the pressurized media.

It is to be appreciated that the reinforced sheath and flow force sensing beam 12 is capable of measuring pressure media flows bi-directionally as indicated by the polarity of the signal produced. The length of the reinforced temperature probe sheath and flow force sensing beam 12 can be dimensioned to extend to a depth of about D/4 to about D/5 of a pipe being measured, with D being the inner diameter of the flow media tube or pipe being measured, for measurements of turbulent or transitional flows. For laminar flow measurements, the reinforced temperature probe sheath and flow force sensing beam 12 can be dimensioned to extend to a depth of about D/2 of a pipe.

The multi-parametric transducer 10 can be employed in a variety of different applications. In certain applications, such as spacecraft, satellite, missile or aircraft, the orientation of the axis of the flow measuring beam should be substantially parallel with the axis of the primary vibrations and shocks. If this requirement is not observed, then the beam measuring flow may also measure vibrations and shocks normal to the beam axis and proportional to its mass, thus potentially introducing an undesirable error into the measurement of flow. This error can be compensated with the addition of a simple subminiature (MEM) piezoelectric accelerometer electronically coupled to an additional stage in the precision electronic signal conditioning circuit 42 which continuously and accurately subtracts the vibration and shock error signal electronically from the flow signal.

Figure 5:
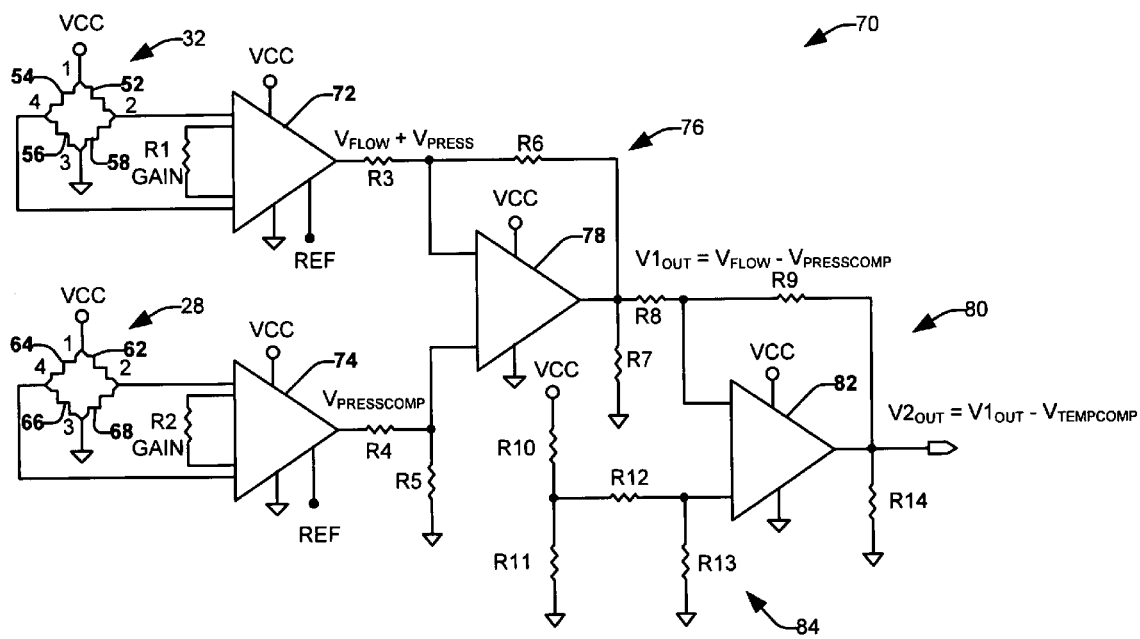
FIG. 5 illustrates a schematic diagram of an exemplary analog circuit for providing a flow rate measurement signal compensated for pressure and temperature in accordance with an aspect of the present invention.

FIG. 5 illustrates an exemplary analog circuit 70 for providing a flow rate measurement signal compensated for pressure and temperature in accordance with an aspect of the present invention. The analog circuit 70 can be integrated into the signal conditioner module 42. The analog circuit 70 includes a first differential amplifier 72 that receives signals from the second full bridge configured flow sensor 32 mounted on the flow sensing tube 44, as illustrated in FIG. 3. The first differential amplifier 72 has a gain set by resistor R1 and provides an output that is indicative of combined flow rate and pressure signal measurement provided by the flow sensor 32. The analog circuit 70 includes a second differential amplifier 74 that receives signals from the first full bridge configured flow sensor 28 mounted on the flow sensing tube 44, as illustrated in FIG. 4. The second differential amplifier 74 has a gain set by resistor R2 and provides an output that is indicative of a pressure signal measurement provided by the pressure error sensor 28.

The analog circuit 70 includes a first compensation circuit 76 that subtracts the output of the second differential comparator 74 from the output of the first differential comparator 72 to provide an output that is indicative of flow rate only compensated for pressure. The first compensation circuit 76 includes resistors R3, R4, R5, R6 and amplifier 78. A second compensation circuit 80 compensates for changes in component values of the analog circuit 70 due to changes in environmental temperature. It is to be appreciated that the pressure error sensor 28 and the flow sensor 32 are temperature compensated gages. However, the second compensation circuit 80 provides for further precise temperature compensation by compensating for component changes caused by temperature changes of the environment of the probe 10. The second compensation circuit 80 includes resistors R7–R14 and an amplifier 82. The second compensation circuit 80 includes a temperature compensation network 84 formed from resistors R10–R13 in a voltage divider configuration coupled between power (VCC) and ground with an output provided to an input of the amplifier 82, where R11 is a precision resistor that is variable with respect to temperature. The output of the first compensation circuit 76 is provided as the other input to the amplifier 78. The second compensation circuit 80 provides an output that is indicative of flow rate with compensation for pressure and component values of the analog circuit 70 due to changes in environmental temperature.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A media flow transducer comprising:
    an enclosure having an inner bore that defines a port;
    an inner chamber coaxial with the inner bore and disposed in the enclosure;
    a sensing tube surrounding at least a portion of the inner chamber;
    a flow force sensing beam having a first end that extends through the sensing tube toward a signal end of the transducer and a second end that extends through the port outside the enclosure toward a measurement end of the transducer, the flow force sensing beam being configured to sense a flow of media along a media flow axis at the measurement end and transfer a bending moment of the beam to the sensing tube;

a flow sensor with measuring portions positioned on the sensing tube along a flow sensing axis that is substantially parallel to the media flow axis that provides a first signal indicative of the media flow rate at the measurement end of the flow force sensing beam and pressure in the sensing tube;

a pressure error sensor with measuring portions positioned on the sensing tube along a neutral axis, that is substantially perpendicular and 90° offset from the flow sensing axis, that provides a second signal indicative of the pressure in the sensing tube; and a circuit operative to subtract the second signal from the first signal to provide an output signal indicative of the media flow rate at the measurement end of the transducer compensated for pressure in the sensing tube.

2. The transducer of claim 1, wherein the flow force sensing beam is a temperature probe having a resistive temperature device (RTD) element disposed in a reinforced sheath at the measurement end of the transducer, the RTD element being configured to transmit a third signal indicative of temperature at the measurement end of the transducer to the signal end of the transducer.

3. The transducer of claim 2, wherein the sensing tube is a flow sensing tube, and the transducer further comprises:

a pressure sensing tube coaxial and adjacent the flow sensing tube, the pressure sensing tube surrounding at least a portion of the inner chamber adjacent the flow sensing tube; and a pressure sensor with measuring portions positioned on the pressure sensing tube that provides a fourth signal indicative of pressure in the sensing tube and at the measurement end of the transducer.

4. The transducer of claim 3, further comprising a signal conditioning module disposed near the signal end of the transducer, the signal conditioning module receives and processes the first, second, third and fourth signals via signal wires from respective measurement devices, and provides selective temperature sensing, flow rate sensing, and pressure sensing outputs on signal wires coupled to respective connector pins of an electrical receptacle sealed to the enclosure at the signal end of the transducer.

5. The transducer of claim 1, wherein the flow sensor and the pressure flow sensors are full bridge, temperature compensated solid state strain gage arrangements with four legs, the flow sensor including two legs positioned on a first side of the flow sensing tube and two legs positioned on a second side of the flow sensing tube.

6. The transducer of claim 5, wherein the circuit is an analog circuit comprising:

a first differential amplifier coupled to the first flow sensor to provide a first voltage that is proportional to the media flow rate at the measurement end of the transducer and pressure in the sensing tube;

a second differential amplifier coupled to the second flow sensor to provide a second voltage that is indicative of pressure in the sensing tube; and a compensation circuit that receives the first and second voltages and provides a third voltage that is indicative of the media flow rate compensated for pressure in the sensing tube.

7. The transducer of claim 6, wherein the analog circuit further comprises a second compensation circuit that receives the third voltage and a fourth voltage provided by a temperature compensation network and provides a fifth voltage indicative of the media flow rate compensated for changes in pressure and component values of the analog circuit due to changes in environmental temperature.

8. The transducer of claim 1, wherein the sensing tube is a flow sensing tube and the inner chamber is a first inner chamber, and the transducer further comprises:

a pressure sensing tube coaxial and adjacent the flow sensing tube and disposed toward the measurement end of the transducer relative to the flow sensing tube, the pressure sensing tube surrounding at least a portion of a second inner chamber adjacent the first inner chamber; and a pressure sensor with measuring portions positioned on the pressure sensing tube that provides a signal indicative of pressure in the pressure sensing tube and at the measurement end of the transducer.

9. The transducer of claim 8, wherein the pressure sensor is a full bridge, temperature compensated metal film strain gage arrangement.

10. The transducer of claim 1, wherein the enclosure and flow sensing beam are formed of one of any variation in alloys of inconel, stainless steel and hastelloy.

11. A multi-parametric transducer comprising:

an enclosure having an inner bore that defines a port;

an inner chamber coaxial with the inner bore and disposed in the enclosure;

a sensing tube surrounding at least a portion of the inner chamber;

a temperature probe having a resistive temperature device (RTD) element disposed in a reinforced sheath at a measurement end of the transducer, the reinforced sheath being configured as a flow force sensing beam having a first end that extends through the sensing tube toward a signal end of the transducer and a second end that extends through the port outside the enclosure toward the measurement end of the transducer, the reinforced sheath being configured to sense a flow of media along a media flow axis at the measurement end and transfer a bending moment of the beam to the sensing tube; and a flow sensor with measuring portions positioned on the sensing tube along a flow sensing axis that is substantially parallel to the media flow axis that provides a first signal indicative of the media flow rate at the measurement end of the reinforced sheath.

12. The transducer of claim 11, further comprising a pressure error sensor with measuring portions positioned on the sensing tube along a neutral axis, that is substantially perpendicular and 90° offset from the flow sensing axis that provides a second signal indicative of the pressure in the sensing tube.

13. The transducer of claim 12, further comprising an analog circuit operative to subtract the second signal from the first signal to provide an output signal indicative of the media flow rate at the measurement end of the transducer compensated for pressure in the sensing tube.

14. The transducer of claim 11, wherein the RTD element is bonded in the temperature probe by one a silver potting material and a thermally conductive insert disposed in the temperature probe and the RTD element is configured to transmit a signal indicative of temperature at the measurement end of the transducer to the signal end of the transducer.

15. The transducer of claim 11, wherein the sensing tube is a flow sensing tube, and the transducer further comprises:

a pressure sensing tube coaxial and adjacent the flow sensing tube, the pressure sensing tube surrounding at least a portion of the inner chamber adjacent the flow sensing tube; and a pressure sensor with measuring portions positioned on the pressure sensing tube that provides a signal indicative of pressure in the sensing tube and at the measurement end of the transducer.

16. A multi-parametric transducer comprising:
an enclosure having an inner bore that defines a pressure port at a measurement end of the transducer;
a first inner chamber coaxial with the inner bore and disposed in the enclosure;
a flow sensing tube surrounding at least a portion of the first inner chamber;
a second inner chamber coaxial with the inner bore and disposed in the enclosure, the second inner chamber being adjacent the first inner chamber and disposed toward the measurement end of the transducer relative to the first inner chamber;
a pressure sensing tube coaxial and adjacent the flow sensing tube, the pressure sensing tube surrounding at least a portion of the second inner chamber;
a flow force sensing beam having a first end that extends through the pressure sensing tube and the flow sensing tube toward a signal end of the transducer and a second end that extends through the pressure port outside the enclosure toward the measurement end of the transducer, the flow force sensing beam being configured to sense a flow of media along a media flow axis at the measurement end and transfer a bending moment of the beam to the flow sensing tube;
a flow sensor with measuring portions positioned on the flow sensing tube along a flow sensing axis that is substantially parallel to the media flow axis that provides a signal indicative of the media flow rate at the measurement end of the transducer; and
a pressure sensor with measuring portions positioned on the pressure sensing tube that provides a signal indicative of pressure in the pressure sensing tube and at the measurement end of the transducer.

17. The transducer of claim 16, wherein the flow force sensing beam is a temperature probe having a resistive temperature device (RTD) element disposed in a reinforced sheath at the measurement end of the transducer, the RTD element being configured to transmit a signal indicative of temperature at the measurement end of the transducer to the signal end of the transducer.

18. The transducer of claim 16, further comprising a pressure error sensor with measuring portions positioned on the flow sensing tube along a neutral axis, that is substantially perpendicular and 90° offset from the flow sensing axis, that provides a second signal indicative of the pressure in the flow sensing tube.

19. The transducer of claim 18, further comprising an analog circuit operative to subtract the second signal from the first signal to provide an output signal indicative of the media flow rate at the measurement end of the transducer compensated for pressure in the flow sensing tube.

20. The transducer of claim 19, wherein the analog circuit comprises a compensation circuit that compensates for changes in component values of the analog circuit due to changes in environmental temperature.

* * * * *